United States Patent Office 2,856,295
Patented Oct. 14, 1958

2,856,295

POTATO PANCAKE PRODUCT AND METHOD OF PREPARING SAME

Murray M. Scharf, Green Bay, Wis.

No Drawing. Application May 2, 1955
Serial No. 505,555

10 Claims. (Cl. 99—182)

My invention is directed to the preparation of a new and useful potato pancake product.

Conventional practice by the housewife in the preparation of potato pancakes involves grating the raw potato, admixing the same with flour, usually wheat flour, and commonly also with salt, eggs, onions and spices, whereby to produce a puree of a relatively thick liquid consistency, then spooning it into a hot frying pan containing a cooking or frying oil or fat, and frying to the desired golden brown extent. The method is time-consuming. In efforts to meet this problem, dried potato pancake mixes have been proposed to which only water need be added to make the puree which is then spooned into the hot frying pan. Frozen potato pancake mixes have also been suggested. Such latter products, however, have a number of objections, from the standpoint of preparation and handling thereof as well as from the standpoint of the properties and characteristics of the finished fried potato pancake produced therefrom.

In accordance with my invention, a ready-to-fry potato pancake product has been produced which is easily handled by the housewife as well as by restaurants and the like, and which, when fried, produces a tasty, delectable product. The novel potato pancake product of my invention is produced in the form of a solid, self-sustaining body of a partially pre-heated or pre-cooked potato puree mixture, which is prepared in the form of a finished shape ready to be placed into the frying pan, or which is prepared in the form of a block which may readily be cut or sliced into suitable shapes or slices for placement into the frying pan.

In the practice of my invention, a liquid potato puree product is initially prepared from grated potatoes. This puree product may be of the conventional type, which commonly contains, in addition to the grated, uncooked potatoes, egg material such as yolks or whole eggs, farinaceous material such as flour, particularly wheat flour, and may contain such supplemental ingredients as onions, spices, salt, food colors, and the like. Whatever the specific recipe may be, I have found it particularly desirable, in connection with my present invention as hereafter described, to incorporate into the puree a discoloration inhibitor, which serves to prevent darkening of the puree during and after its preparation. Such inhibitor, for instance, sulfur dioxide, sodium bisulfite or hydrochloric acid (which should subsequently be neutralized) is admixed in small proportion with the puree. The resulting liquid puree is then filled into cans, hermetically sealed therein, and then subjected to elevated temperatures for a period of time sufficient to effect solidification of the puree. The canned solidified puree is then cooled. In use, for instance, both the top and bottom of the can are removed, the block of the solidified puree is pushed out of the can and sliced off in the thickness desired and then fried in a conventional manner.

A typical potato puree mix and an illustrative manner of handling the same in accordance with my invention is set out below in the light of which the invention and the advantages thereof will clearly appear. It will be understood, of course, that many variations in the composition of the potato puree and other changes can be made, in the light of the guiding principles disclosed herein, without departing from the invention.

*Example*

A puree was made from 15 pounds of peeled grated raw potatoes, 12 ounces wheat flour, 4 ounces fresh eggs, ½ ounce onion powder, and ¼ ounce sodium bisulfite. The resulting liquid puree was filled into a number of conventional metal cans to an extent to leave a head space therein of about ⅜ inches. The cans were then hermetically sealed and heated in a steam chamber under 15 pounds/sq. in. pressure at about 250 degrees F. for about 1 hour and then the cans were cooled to room temperature. The effect of this procedure was to cause the potato puree to form a form-sustaining solid block or body. Its physical character was such that, when the tops and bottoms of the cans were removed, the puree blocks could readily be pushed out of the cans and could easily be cut or sliced to any desired shape before being fried.

While, in the specific example set forth above, the liquid potato puree is placed in a conventional metal can, whereby the final shape of the solid block of puree is that of a cylinder, it will, of course, be understood that the shape of the puree block, as prepared or as later treated if desired, may be varied so as to be triangular, square, hexagonal or otherwise in cross section. The shapes cut from said solid puree blocks can obviously be made as fanciful as may be desired such as sticks, cubes, spheres, and the like. Moreover, instead of filling the puree into the can to form a single solid block, the liquid puree can be filled in separate portions of shallow depth, each filling being separated from the other by a sheet of parchment paper or other suitable spacing material, and then said can, after hermetic sealing, is heat processed. In such latter case, for instance, a can may contain, say, eight individual solid patty-like bodies of desired thickness, for example, ⅜ inch, separated from each other by a suitable spacer, and, in such event, no slicing operation is necessary when the puree product is removed from the can. While, in the example set forth above, a specific temperature and time of heating was given, this is merely illustrative and is subject to wide variation. Thus, for instance, the cans can be placed in boiling water and heated for 2½ to 3 hours, or heating can be carried out at more elevated temperatures, under pressure, for 20 to 30 minutes. The essential aspect is that the heating step must be effected under such conditions of temperature and time as to bring about gelation or solidification of the liquid puree.

It may also be pointed out that the heat gelation or solidification of the liquid potato puree need not be effected in the can in which the product is packaged as described above, although this represents the especially important and advantageous embodiment of my invention. The liquid potato puree can be poured into any mold, for instance, an aluminum cylindrical mold, with or without spacers as described above, and heated therein to effect gelation or solidification. The resulting solid cylinders, or spaced patty-like bodies, as the case may be, of potato puree can then be packaged in hermetically sealed containers or, for that matter, in non-hermetically sealed containers. Said solid bodies of potato puree can, if desired, be frozen or quick frozen, but this does not represent the preferred embodiment of my invention.

What I claim as new and desire to protect by Letters Patent of the United States is:

1. A potato pancake product comprising a potato pancake puree containing grated potato and floury farinaceous material, said product being in the form of a heat gelated non-fried solid molded body.

2. A potato pancake product comprising a potato pancake puree containing grated potato, floury farinaceous material, and egg material, said product being in the form of a heat gelated non-fried solid molded body.

3. A potato pancake product, comprising a potato pancake puree containing grated potato, flour, egg material, and a discoloration inhibitor, said product being in the form of a heat gelated non-fried solid molded body.

4. A canned hermetically sealed heat gelated non-fried solidified molded potato pancake product comprising a mixture containing potato puree, flour, egg material, and a discoloration inhibitor, said product being adapted to be sliced with a knife and the resulting slices fried.

5. A canned hermetically sealed heat gelated non-fried potato pancake product comprising a mixture containing potato puree, flour, egg material, and a discoloration inhibitor, said product being in the form of a plurality of solid molded patty-like bodies separated from each other by spacers.

6. A method of preparing a potato pancake product which comprises providing a raw liquid potato pancake puree containing grated potato and floury farinaceous material, filling said puree into a container, heating said puree within said container and thereby converting it into a solid body.

7. A method of preparing a potato pancake product which comprises providing a raw liquid puree containing raw grated potato, flour, egg material, and a discoloration inhibitor, filling said puree into a container, heating said puree within said container and thereby converting it into a solid generally tubular body which is adapted to be sliced with a knife and the resulting slices fried.

8. A method of preparing a potato pancake product which comprises providing a raw liquid puree containing grated raw potato, flour, egg material, and a discoloration inhibitor, filling said puree into a container in individual portions separated from each other by spacers, heating said puree within said container and thereby converting it into individual solid patty-like bodies which are adapted to be fried.

9. A method of preparing a potato pancake product which comprises providing a raw liquid potato puree containing grated raw potato, flour, egg material, and a discoloration inhibitor, filling said puree into a mold, heating said puree within said mold and thereby converting it into a solid body, removing it from said mold, and enclosing it in a protective package.

10. A method of preparing a potato pancake product which comprises providing a raw liquid potato puree containing grated raw potato, flour, egg material, and a discoloration inhibitor, filling said puree into a mold, heating said puree within said mold and thereby converting it into a solid body, removing it from said mold, enclosing it in a protective package, and freezing it therein.

References Cited in the file of this patent

UNITED STATES PATENTS

| | | |
|---|---|---|
| 1,811,772 | Willoughby | June 23, 1931 |
| 2,006,146 | Miller | June 25, 1935 |
| 2,434,388 | Brehm | Jan. 13, 1948 |

FOREIGN PATENTS

| | | |
|---|---|---|
| 10,611 | Great Britain | Sept. 8, 1900 |

OTHER REFERENCES

"Everybody's Cook Book," 1924, by I. E. Lord, publ. by Henry Holt & Co. (New York, N. Y.), page 425.

"Everybody's Cook Book," 1924, by Lord, publ. by Henry Holt & Co. (New York, N. Y.), page 224 relied on.

"Quick Frozen Foods," February 1948, p. 114.

"Quick Frozen Foods," June 1949, p. 69.

"American Potato Journal," December 1953, vol. 30, No. 12, pp. 285 and 286.